United States Patent
Wagner

(10) Patent No.: US 10,125,624 B2
(45) Date of Patent: Nov. 13, 2018

(54) GAS TURBINE WITH COOLING OF THE LAST TURBINE STAGE

(71) Applicant: Siemens Aktiengesellschaft, Munich (DE)

(72) Inventor: Michael Wagner, Dinslaken (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 15/524,330

(22) PCT Filed: Nov. 11, 2015

(86) PCT No.: PCT/EP2015/076288
§ 371 (c)(1),
(2) Date: May 4, 2017

(87) PCT Pub. No.: WO2016/078980
PCT Pub. Date: May 26, 2016

(65) Prior Publication Data
US 2017/0321566 A1    Nov. 9, 2017

(30) Foreign Application Priority Data
Nov. 20, 2014  (EP) .................... 14193992

(51) Int. Cl.
*F01D 11/00* (2006.01)
*F01D 5/08* (2006.01)
*F01D 11/04* (2006.01)

(52) U.S. Cl.
CPC ............ *F01D 11/001* (2013.01); *F01D 5/082* (2013.01); *F01D 11/04* (2013.01);
(Continued)

(58) Field of Classification Search
CPC ........ F01D 11/001; F01D 11/02; F01D 11/04; F01D 5/082
See application file for complete search history.

(56) References Cited

U.S. PATENT DOCUMENTS

| | | |
|---|---|---|
| 5,054,996 A | 10/1991 | Carreno |
| 5,564,896 A | 10/1996 | Beeck et al. |
| 2005/0217277 A1 | 10/2005 | Alvanos et al. |

FOREIGN PATENT DOCUMENTS

| | | |
|---|---|---|
| CN | 1058449 A | 2/1992 |
| EP | 0704603 A2 | 4/1996 |

(Continued)

OTHER PUBLICATIONS

EP Search Report dated May 7, 2015, for EP patent application No. 14193992.6.
(Continued)

*Primary Examiner* — Jason Shanske
*Assistant Examiner* — Michael Sehn
(74) *Attorney, Agent, or Firm* — Beusse Wolter Sanks & Maire

(57) ABSTRACT

An exhaust-gas section for a gas turbine, having a surrounding shroud having a first opening, which is arranged in a region of the exhaust-gas section that has a pressure lower than the air pressure of the outer environment of the gas turbine in an operating state of the gas turbine and which forms the outlet of an air channel, the inlet of which is connected to the outer environment of the gas turbine. The air channel has a chamber at the outlet-side end of the air channel, which chamber has a second opening, through which a specified gas mass flow is admitted into the chamber.

13 Claims, 3 Drawing Sheets

(52) U.S. Cl.
CPC .. *F05D 2220/3215* (2013.01); *F05D 2240/55* (2013.01); *F05D 2270/3013* (2013.01); *Y02T 50/673* (2013.01); *Y02T 50/676* (2013.01)

(56) References Cited

FOREIGN PATENT DOCUMENTS

| | | |
|---|---|---|
| GB | 1270959 A | 4/1972 |
| JP | 2005337236 A | 12/2005 |
| WO | 2012141858 A1 | 10/2012 |

OTHER PUBLICATIONS

International Search Report dated Feb. 9, 2016, for PCT/EP2015/076288.
IPPR (PCT/IPEA/416 and 409) dated Nov. 9, 2016, for PCT/EP2015/076288.
CN search report dated Jul. 3, 2018, for CN patent application no. 201580063009X.

GAS TURBINE WITH COOLING OF THE LAST TURBINE STAGE

CROSS REFERENCE TO RELATED APPLICATIONS

This application is the US National Stage of International Application No. PCT/EP2015/076288 filed Nov. 11, 2015, and claims the benefit thereof. The International Application claims the benefit of European Application No. EP14193992 filed Nov. 20, 2014. All of the applications are incorporated by reference herein in their entirety.

FIELD OF INVENTION

The invention relates to a gas turbine having a stator which comprises an exhaust-gas section, the inner shroud of which is separated from the platforms of the rotor blades of the blade wheel of the last turbine stage on the hot-gas side of the rotor of the gas turbine by an axial gap, the gap connecting the exhaust-gas section to a wheel-side space of the blade wheel, said space, in one operating state of the gas turbine, having a lower pressure than the air pressure of the outside environment of the gas turbine and said space having an air inlet which is connected to the outside environment of the gas turbine via an air duct.

BACKGROUND OF INVENTION

A gas turbine is a continuous-flow machine, in which a gas under pressure expands. It consists of a turbine or expander, an upstream compressor and an interposed combustion chamber. The principle of operation is based on the cycle process (Joule process): The latter compresses air by means of the blades of one or several compressor stages, then mixes this in the combustion chamber with a gaseous or liquid fuel, ignites it and burns it.

A hot gas (mixture of combustion gas and air) thus forms, which expands in the following turbine part, wherein thermal energy is converted to mechanical energy and initially drives the compressor. The remaining portion is, in the turboshaft engine, used for driving a generator, a propeller or other rotating consumers. The expanded hot gas is guided into an exhaust-gas section which, for this purpose, is surrounded by a heat-resistant shroud, the latter forming the boundary for the hot-gas duct of the exhaust-gas section. At the same time, the inner shroud of the exhaust-gas section separates the latter from the internal parts of the stator arranged around the axis.

Due to constructional constraints, a gas turbine exhaust-gas section cannot be adequately sealed off from the surroundings. Owing to thermal expansion during operation at the last turbine stage on the hot-gas side of the rotor, an axial gap is present between the platforms of the rotor blades and the inner shroud of the exhaust-gas section, the gap connecting the exhaust-gas section to a wheel-side space, that is to say to a space adjacent to the blade wheel. Since the exhaust-gas section can have a positive pressure in relation to the surroundings in the case of unfavorable operating states or hardware configurations, leakage of hot exhaust gases into the surroundings or into the gas turbine enclosure cannot be ruled out. This gives rise to an increased temperature load on the components of the gas turbine and emissions of harmful exhaust gases. The latter presents a safety risk.

The abovementioned unfavorable operating states are small hot-gas mass flows, that is to say low power of the gas turbine, which, due to increasing flexibilization, are becoming ever more important. Furthermore, relatively high exhaust-gas pressures can occur as a result of aerodynamic changes at the last turbine stage or increased exhaust-gas pressure losses in the boiler.

In some gas turbine types, a negative pressure which arises in regions of the exhaust-gas section is used in order to draw in air from the surroundings via an air inlet in the wheel-side space and an air duct connected thereto and to use this air for the purpose of cooling. In particular here, directly after the last rotor blade row of the turbine part of the gas turbine in the flow direction of the hot gas, pressures occur during normal operation which lie below the ambient pressure of the air in the surroundings of the gas turbine. Corresponding openings can thus be made here which draw in air from the surroundings via cooling ducts so that this air can be used for cooling this region, in particular also the wheel-side space located nearby which communicates with the bearing space of the rear turbine bearing. This principle is, for example, described in GB 1270959 or WO 2012/141858 A1.

As described above, however, the problem arises that as the machine power decreases, the exhaust-gas pressure rises and the negative pressure therefore drops. If the exhaust-gas pressure exceeds the ambient pressure, a flow reversal occurs in the air duct and consequently significant leakage of exhaust gas occurs via this opening. This is to be avoided at all costs since, due to the air ducts provided, very large exhaust-gas leakage quantities can occur. There are currently no measures which could prevent exhaust-gas leakage here. This effectively limits the flexibility of the gas turbine, in particular in the range of small loads, since excessive exhaust-gas leakage must be reliably avoided.

SUMMARY OF INVENTION

It is therefore an object of the invention to provide a gas turbine of the type initially mentioned which ensures a particularly flexible operation of the gas turbine by means of the reliable avoidance of exhaust-gas leakage in all operating states.

This object is achieved as claimed in the invention by virtue of the fact that the air inlet is connected to the air duct via a chamber, the latter having an opening through which the chamber is acted upon by a predetermined gas mass flow.

Here, the invention is based on the consideration that small exhaust-gas leakage quantities during partial-load operation through seals or hooks can be accepted or compensated for by means of new sealing concepts. A positive pressure and consequently a flow reversal in places which are designed for the drawing-in of ambient air via air ducts, in particular in the wheel-side space in the last turbine stage on the hot-gas side, is not acceptable, since in this case significant exhaust-gas leakage quantities will occur even in the case of low positive pressures. Therefore, in order to also permit operation at low partial load, a constructional solution should be created which makes sure that a return flow of exhaust gas is reliably avoided even in the case of a reversal of the pressure conditions of such a nature that a higher pressure prevails at the outlet of the air duct in the exhaust-gas duct than in the surroundings of the gas turbine. This is achievable by the air duct no longer being directly connected to the wheel-side space in question but there being an additional interposed chamber. This means that the air duct firstly opens into this chamber. From the chamber there is a connection to the wheel-side space. The chamber has an additional opening through which the chamber is acted upon by a predetermined gas mass flow. In other words: The chamber has at least three openings, namely a connection to the wheel-side space, a connection to the air duct leading to the surroundings and the opening for said predetermined gas mass flow. This gas mass flow consists of a harmless gas, e.g. air, and completely flushes the chamber. The result of this is that, in the case of a pressure reversal, the return mass flow through the air duct is fed from the gas mass flow and not from the exhaust gas. As a consequence, no exhaust gas can escape. During normal operation, the gas mass flow is added only to the air flow which is drawn in from the outside.

The chamber in this case advantageously directly adjoins the wheel-side space. The connection of the wheel-side space to the chamber is realized here in a particularly simple manner in terms of construction by an opening in the dividing wall between the wheel-side space and the chamber.

The chamber in the outlet region of the air duct, which acts as a buffer chamber, is advantageously designed in such a manner that the pressure in the chamber is less than 30 mbar and advantageously less than 10 mbar above the pressure in the wheel-side space. Generally, the pressure in the chamber should be only slightly above the exhaust-gas pressure, the latter corresponding to the pressure in the wheel-side space, that is to say the chamber should not be charged by the constant gas mass flow. This ensures that the chamber does not prevent the desired drawing-in of outside air into the wheel-side space. To that end, in particular, the opening between the chamber and the wheel-side space should be designed such that it is large enough that the gas mass flow can flow continuously into the wheel-side space during normal operation.

In an advantageous configuration, the wheel-side space has a further opening through which flushing air is supplied. As a result of this, besides the ambient air drawn in from the outside, the wheel-side space is also cooled by flushing air, e.g. from compressor extractions or an external blower, which further improves the cooling.

In a further advantageous configuration, the source of the gas mass flow with which the chamber is flushed is designed for a mass flow that is substantially constant with varying pressure in the wheel-side space. This ensures that there is at all times sufficient and complete flushing of the chamber with the gas mass flow, irrespective of the pressure which prevails in the region of the gap of the shroud inside the exhaust-gas section and thus also in the wheel-side space, and thus in particular in the case of relatively high pressures in this region. This can in particular be realized by the source of the gas mass flow being at a sufficiently high pressure level, so that the pressure fluctuations inside the exhaust-gas section which are to be expected during operation have no influence on the mass flow. As a result it can be ensured that, in the event of a flow reversal in the air duct, there is at all times a sufficient mass flow into the chamber, from which the return flow into the surroundings can be fed.

In a first advantageous configuration, there is a blower connected upstream of the opening of the chamber through which the gas mass flow is introduced. By means of a blower which is provided specifically for the gas mass flow for flushing the chamber and which can be designed and controlled accordingly, the sufficient gas mass flow can be regulated in a particularly simple manner. It would also be conceivable here to operate the blower only during the critical operating states, during which there is a risk of a flow reversal.

In a second alternative or additional advantageous configuration, there is a compressor extraction device connected upstream of the opening of the chamber through which the gas mass flow is introduced. In other words: The gas mass flow is fed by means of bleed air from the compressor. Since, in a gas turbine, air from the compressor is used at widely differing pressure levels for various purposes in any case, a corresponding extraction system can also be extended in order to feed the chamber with the required gas mass flow.

In an advantageous configuration, it is furthermore possible for a sealing-air seal of the shaft of the gas turbine to be assigned to the opening of the chamber through which the gas mass flow is introduced. This is understood to mean that the opening and therefore the chamber are connected in parallel on the compressed-air supply side with a sealing-air seal or are supplied with compressed air by means of this. This allows the chamber to be acted upon by a gas mass flow in a particularly simple manner: The exhaust-gas section surrounds the shaft bearing of the gas turbine in the part on the turbine side. Said bearing is designed such that it can be axially displaced for the purpose of compensating for thermal expansion and is thus provided with a labyrinth seal, which is acted upon by sealing air. By means of simple bores in the region of this sealing-air seal, the sealing air present there, which can have a pressure of a few bar, can be bled off and used to act upon the chamber. Alternatively, the sealing-air seal and the chamber can be supplied from the same compressed-air source (parallel connection). This solution can be realized with particularly little constructional effort.

In an advantageous configuration of the gas turbine, the chamber furthermore is of encircling design around the axis of the gas turbine. As a result, a reliable avoidance of hot-gas return flow into the air duct or the several air ducts distributed along the circumference is ensured in each circumferential region.

A power plant advantageously comprises a gas turbine of this type.

The advantages achieved with the invention consist in particular in the fact that, as a result of the introduction of a chamber which is flushed with a fixed gas mass flow at the outlet of an air duct normally intended for drawing in ambient air by means of a negative pressure, a return flow of harmful exhaust gas in case of a flow reversal owing to an increase in the pressure can be reliably prevented. Instead the reversed mass flow is completely fed by the gas mass flow introduced into the chamber. This results in advantages regarding the integrity of the components and the increased safety against exhaust-gas emissions in the enclosure of the gas turbine. Without this measure, one would have to dispense with the bores completely, which would have significant disadvantages regarding the gas-turbine heat emission during base load operation.

BRIEF DESCRIPTION OF THE DRAWINGS

An exemplary embodiment of the invention is explained in more detail on the basis of a drawing, in which.

DETAILED DESCRIPTION OF INVENTION

Identical parts are provided with the same reference designations in all of the figures.

Figure 1:
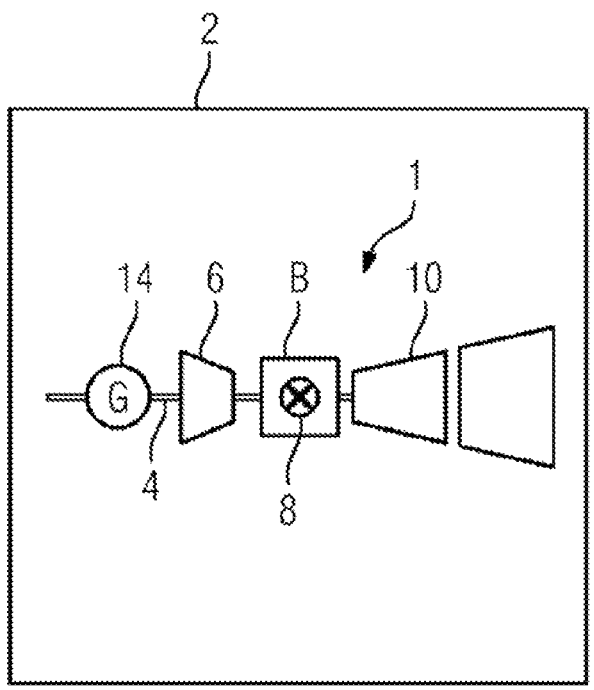
FIG. 1 shows a schematic representation of a gas turbine in a power plant.

FIG. 1 shows, schematically, a gas turbine 1 in a power plant 2. The gas turbine 1 has in the interior a rotor mounted in a rotatable manner around a shaft 4 (axial direction), the rotor also being referred to as the turbine rotor and being surrounded by the stationary part of the gas turbine 1, the stator. In the flow direction of the medium flowing through the gas turbine 1, a compressor 6 follows firstly along the shaft 4. The air is guided from the outlet of the compressor 6 into a combustion chamber 8, the latter being supplied with fuel B. A turbine 10 and the exhaust-gas section 12 follow the combustion chamber 8. On the compressor side, a generator 14 is arranged on the shaft 4 of the gas turbine 1.

Figure 2:
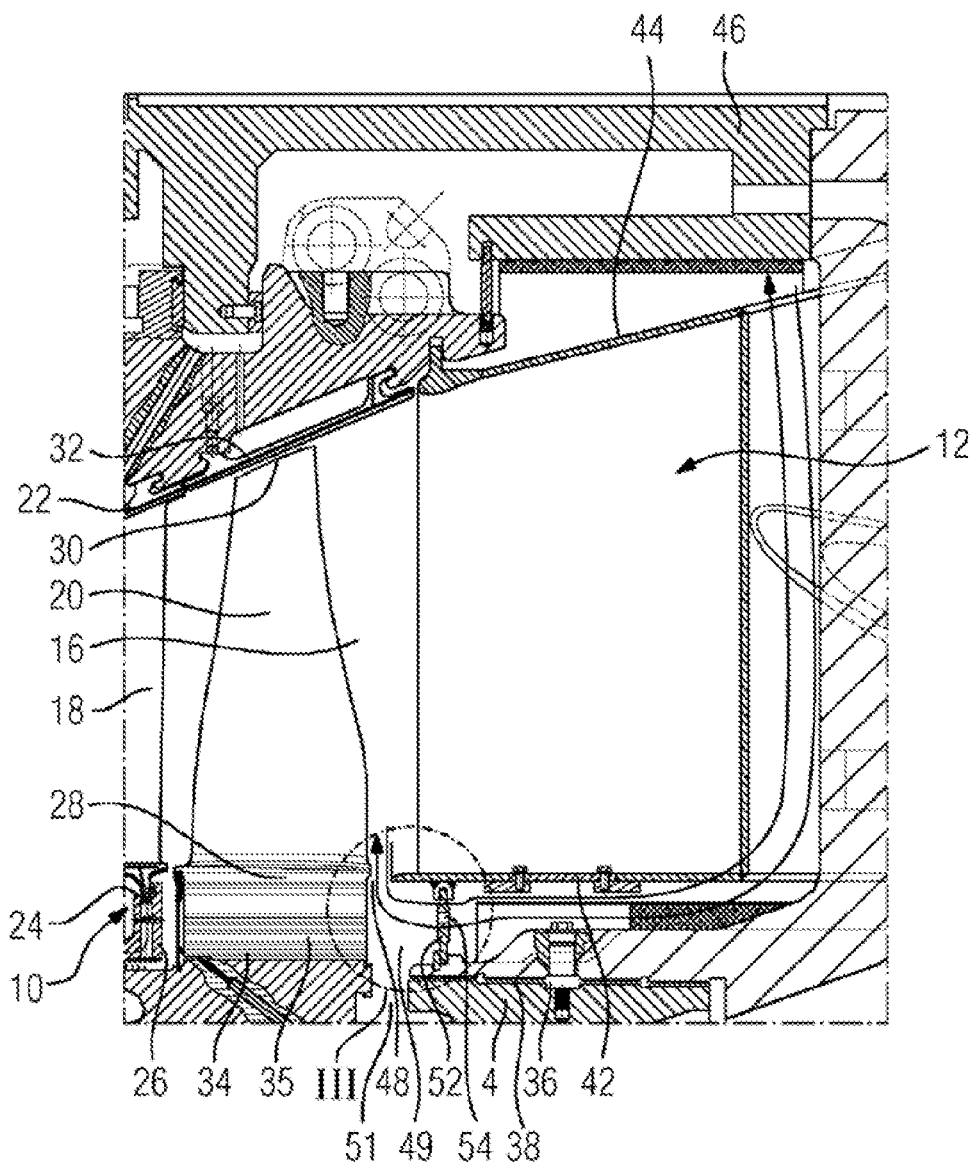
FIG. 2 shows a longitudinal section through the upper half of the last turbine stage and the exhaust-gas section of the gas turbine.

FIG. 2 shows in detail in a longitudinal section the last part on the flow side of the turbine 10 of the gas turbine 1 as well as the adjacent part of the exhaust-gas section 12. The partial section shows only the upper half of the gas turbine 1, as is known from the prior art.

The hot-gas duct 16, which is annular in cross section, is fed with hot gas from the combustion chamber 8 upstream of the turbine 10. The turbine 10 comprises several turbine stages connected one behind the other, only the last turbine stage on the hot-gas side being illustrated in FIG. 2, that is to say the turbine stage through which the hot gas passes last directly before flowing into the exhaust-gas section 12. Each turbine stage is formed from two blade rings. As viewed in the flow direction of the hot gas, a rotor blade row formed from rotor blades 20 follows a guide vane row formed from guide vanes 18 in the hot-gas duct 16. The guide vanes 18 and the rotor blades 20 have slightly curved profiles, similar to an aircraft wing.

The guide vanes 18 here are fastened to the stator. Besides the actual vane airfoil, each guide vane 18 has a guide vane foot, also referred to as a platform 22, and a guide vane head 24 positioned opposite the platform 22. The guide vane head 24 faces the shaft 4 and is fixed to an inner ring 26. Each inner ring 26 here encircles the shaft 4 of the rotor.

Likewise each rotor blade 20 has a rotor blade foot of such type, referred to as a platform 28, but ends in a rotor blade tip 30. Opposite the rotor blade tip 30 in the hot-gas duct 16, there is arranged an annular lining 32. The lining 32, together with the platforms 22, 28 and the guide vane heads 24, consequently forms the boundary of the hot-gas duct 16.

The rotor blades 20 of a rotor blade row are attached to the shaft 4 by means of one turbine disk 34 in each case. The rotor blades 20 and turbine disk 34 thus form a blade wheel 35. The rotor blades 20 thus form components of the rotating part of the gas turbine 1, namely of the rotor. An analogous structure with blade rows comprising guide vanes and rotor blades 18, 20 can likewise be found in the compressor 6.

FIG. 2 furthermore shows the sealing on the turbine side of the bearing of the shaft 4 of the gas turbine 1. The cylindrical-casing-type boundary surface between the shaft 4 and the stator is in this case designed as a sealing-air seal 36. The sealing-air seal 36 comprises a sealing labyrinth 38, which extends across the entire boundary surface, and a sealing-air introduction device positioned outside the detail of FIG. 2. The latter is supplied with air having a high pressure from a compressor extraction device. Such compressor extraction devices can be provided at various places in the compressor 6, so that air of various pressure levels can be extracted and made available in the gas turbine 1, for example for sealing-air seals but also as cooling air for e.g. a film cooling of components of the turbine 10.

Sealing of the shaft bearing is achieved by means of the sealing-air seal 36, an axial displacement of the shaft 4, e.g. for the purpose of compensating for thermal expansion of the rotor components, remaining possible at the same time.

During the operation of the gas turbine 1, air is drawn in by the compressor 6 through a drawing-in housing, which is not shown in more detail, and compressed. The compressed air made available at the end of the compressor 6 on the turbine side is guided into the combustion chamber 8 and mixed with a fuel B there. The mixture is then burnt in the combustion chamber 8 to form a hot gas. From there the hot gas flows along the hot-gas duct 16 and past the guide vanes 18 and the rotor blades 20.

Part of the internal energy of the fluid flow is extracted due to the laminar and, as far as possible, vortex-free flow around the vanes and blades 18, 20 and is transferred to the rotor blades 20 of the turbine 10. The rotor is then set into rotation via these rotor blades, whereby initially the compressor 6 is driven. The useful power is delivered to the generator 14.

FIG. 2 furthermore shows that, after the last rotor blade row, the hot-gas duct 16 merges into the exhaust-gas section 12. The exhaust-gas section 12 therefore likewise has an annular cross section corresponding to the hot-gas duct 16, which cross section however expands along the shaft. The exhaust-gas section 12 comprises here a cylindrical inner shroud 42, which surrounds the shaft 4, as well as a conical outer shroud 44, which is fastened to the housing 46 of the gas turbine 1. The outer shroud 44 is seamlessly adjacent to the lining 32 opposite the last rotor blade row, while the inner shroud 42 is adjacent to the platforms 28 of the last rotor blade row at an equal radial distance from the axis of the gas turbine 1. However, the inner shroud 42 is here separated from the platforms 28 of the last rotor blade row in the axial direction by an axial gap 48, the latter forming an annular opening.

The so-called wheel-side space 49 of the blade wheel 35 of the last turbine stage is connected to the hot-gas duct 16 of the exhaust-gas section 12 by means of the gap 48. Here, a negative pressure typically prevails during normal operation of the gas turbine 1, that is to say a pressure which is lower than the pressure of the ambient air in the outside region of the gas turbine 1. This is used in order to draw in ambient air from the outside and thereby to cool the wheel-side space 49.

For this purpose an air duct 50 is formed in the rear region, in relation to the hot-gas duct 16, of the inner shroud 42 of the exhaust-gas section 12. Said air duct comprises the hollow space formed between the inner shroud 42 and the stator-side part of the sealing-air seal 36. The disk-shaped dividing wall 52, which separates this hollow space from the wheel-side space 49 of the last rotor blade row, is pierced by a plurality of axial bores 54, which extend along the entire circumference of the gas turbine 1. On the inlet side (not illustrated), the air duct 50 is connected to the surroundings of the gas turbine 1. On the outlet side, it opens into the wheel-side space 49 through the bores 54. The wheel-side space 49 can additionally be supplied with flushing air through further openings 51, which flushing air is made available from compressor extractions or blowers.

During normal operation of the gas turbine 1, the negative pressure of the exhaust gas after the last rotor blade row ensures that air is drawn in from the surroundings through the air duct 50. In certain modes of operation, in particular at low partial load, it can, however, happen that a positive pressure prevails here in relation to the surroundings. This positive pressure also prevails in the wheel-side space 49 due to the connection via the gap 48. In the gas turbine 1 illustrated in FIG. 2, a flow reversal can consequently occur in the air duct 50, so that harmful exhaust gas enters the surroundings through the air duct 50.

This is prevented by means of a modification to the connection between the air duct 50 and the wheel-side space 49 (indicated by circle III). This modification is shown, enlarged, in FIG. 3.

Figure 3:
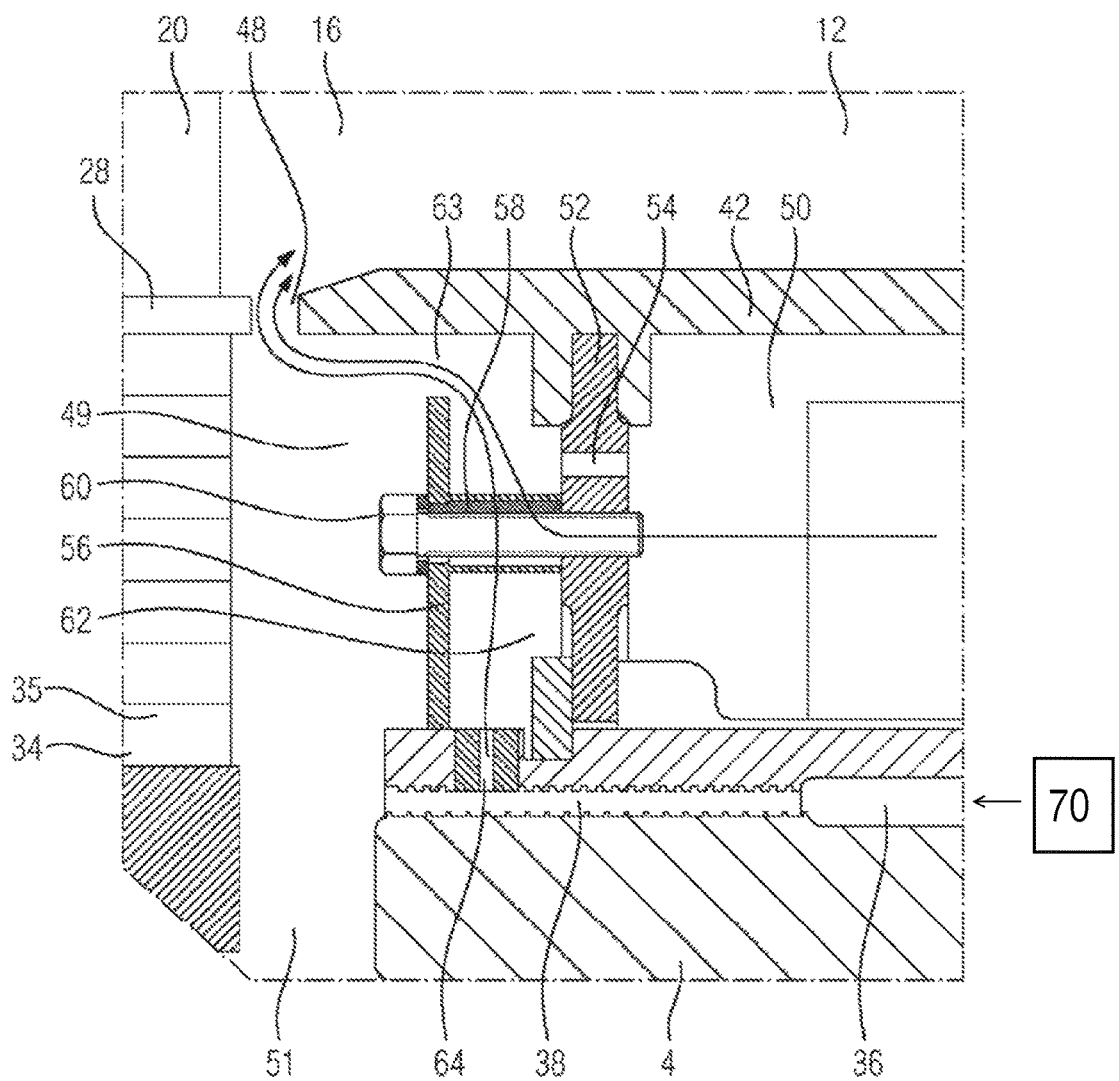
FIG. 3 shows a longitudinal section through a buffer chamber at the inlet of an air duct for drawing in ambient air.

FIG. 3 shows firstly the components known from FIG. 2 in the region mentioned, such as the shaft 4, the part of the sealing-air seal 36 facing the last rotor blade row, the inner shroud 42 and the dividing wall 52 with the axial bores 54. Parallel to the dividing wall 52, however, on its side facing the last rotor blade row, there is arranged a further dividing wall 56.

This has cylindrical-casing-type spacers 58, which extend to the first dividing wall 52. The second dividing wall 56 is fastened to the first dividing wall 52 by means of screws 60 fitted through the spacers 58.

The dividing walls 52, 56, inner shroud 42 and the stator-side section of the sealing-air seal 36 thus form a chamber 62, which is arranged between the bore 54 leading to the air duct 50 and the wheel-side space 49 and extends circumferentially around the entire axis of the gas turbine 1. The dividing wall 56 has an outer radius that is slightly smaller than that of the dividing wall 52, so that a radial gap 63 is formed between the dividing wall 56 and the inner shroud 42 and now connects the chamber 62 to the wheel-side space 49. The air drawn in from the outside space now firstly enters the chamber 62 through the bores 54 in the dividing wall 52 and, from there, enters the wheel-side space 49 through the gap 63 (and subsequently also enters the hot-gas duct 16 through the gap 48).

The chamber 62 additionally has openings 64 which, distributed along the circumference of the gas turbine 1, extend as bores in the radial direction through the stator-side part of the sealing-air seal 36. The chamber 62 is thereby connected to the intermediate space, the latter being acted upon by sealing air, of the sealing labyrinth 38. Since air is present here at a comparatively high pressure, that is to say in the range of a few bar, a continuous mass flow of sealing air into the chamber 62 thus occurs in a manner dependent on the size and number of the openings 64. Due to the comparatively high pressure in the sealing-air seal 36 in comparison to the exhaust-gas pressures to be expected, this mass flow is largely independent of the pressure conditions in the hot-gas duct 16 of the exhaust-gas section 12. In an alternative embodiment, it may be the case that the opening 64 does not open into the sealing-air seal 36 but rather is connected to another compressed-air supply, which likewise supplies the sealing-air seal 36 with compressed air.

This results in a parallel supply of compressed air to the chamber 62 and to the sealing-air seal 36.

A further precondition for this is that the chamber 62 is not charged. This is achieved in particular by the gap 63 between the dividing wall 56 and the inner shroud 42 being sufficiently largely dimensioned, so that the air mass flow supplied through the openings 64 can always escape directly into the wheel-side space 49 and the chamber 62 remains at a pressure level that is only slightly higher than that of the exhaust gas, that is to say just a few mbar above the exhaust-gas pressure. The decisive factor is that the chamber 62 is completely flushed with cooling air.

In alternative embodiments which are not shown, the air mass flow into the chamber 62 can also originate from other sources. For example, a separate blower 70 can be provided or a separate compressor extraction device can be provided, from which the air mass flow is made available.

Due to the formation of the chamber 62 between the air duct 50 and the wheel-side space 49, the intended drawing-in of air from the outside space during full-load or high partial-load operation is not hindered. Since the pressure level of the chamber 62 lies only slightly above the exhaust-gas pressure, a drawing-in of outside air in the case of a negative pressure of the exhaust gas still occurs. The outside air which is drawn in mixes with the air mass flow from the sealing-air seal 36 in the chamber 62 and enters the wheel-side space 49 through the gap 63 and, from there, enters the hot-gas duct 16 of the exhaust-gas section 12 through the axial gap 48.

During low partial-load operation or in other operating states, in which the pressure conditions reverse, that is to say the exhaust-gas pressure lies above the ambient pressure, the flow through the air duct 50 will reverse. Since, however, the chamber 62 is now arranged at the outlet of the air duct 50 on the hot-gas-duct side and is flushed with air by means of the continuous mass flow from the openings 64, the return flow is now fed exclusively from the air mass flow which is supplied through the openings 64. As a result, a discharge of harmful exhaust gas into the surroundings through the air duct 50 is prevented.

The invention claimed is:

1. A gas turbine comprising:
   a stator which comprises an exhaust-gas section, an inner shroud of which is separated from platforms of rotor blades of a blade wheel of a last turbine stage on a hot-gas side of a rotor of the gas turbine by an axial gap, the axial gap connecting the exhaust-gas section to a wheel-side space of the blade wheel, said wheel-side space, in one operating state of the gas turbine, comprising a lower pressure than an air pressure of the outside environment of the gas turbine and said wheel-side space comprising an air inlet which is connected to the outside environment of the gas turbine via an air duct,
   wherein the air inlet is connected to the air duct via a chamber, the chamber comprising a first opening to the air duct and a second opening through which the chamber is acted upon by a predetermined gas mass flow.

2. The gas turbine as claimed in claim 1, wherein the chamber adjoins the wheel-side space.

3. The gas turbine as claimed in claim 1, wherein the chamber is designed in such a manner that a pressure in the chamber is less than 30 mbar above the lower pressure in the wheel-side space.

4. The gas turbine as claimed in claim 3, wherein the pressure in the chamber is less than 10 mbar above the lower pressure in the wheel-side space.

5. The gas turbine as claimed in claim 1, wherein the wheel-side space has a further opening through which flushing air is supplied.

6. The gas turbine as claimed in claim 1, wherein a source of the predetermined gas mass flow is designed for a mass flow that is substantially constant with varying pressure in the wheel-side space.

7. The gas turbine as claimed in claim 1, wherein there is a blower connected upstream of the second opening of the chamber.

8. The gas turbine as claimed in claim 1, wherein there is a compressor connected upstream of the second opening of the chamber.

9. The gas turbine as claimed in claim 1, wherein a sealing-air seal of a shaft of the gas turbine is assigned to the second opening of the chamber.

10. The gas turbine as claimed in claim 1,
wherein the chamber is of encircling design around a longitudinal axis of the gas turbine.

11. A power plant comprising
a gas turbine as claimed in claim 1.

12. A gas turbine, comprising:
a turbine comprising a last stage comprising a blade wheel comprising rotor blades;
an exhaust gas section comprising an inner shroud separated from platforms of the rotor blades by an axial gap that connects a hot gas path in the exhaust gas section with a wheel side space of the blade wheel; and
a chamber in fluid communication with the wheel side space via an air inlet opening, the chamber comprising a first opening to an air duct that provides direct fluid communication between the chamber and a source of gas at ambient atmospheric pressure, and a second opening to a second flow path that provides direct fluid communication between the chamber and a source of compressed gas.

13. The gas turbine of claim 12, further comprising a combustor and a compressor configured to supply compressed air to the combustor, wherein the source of compressed gas comprises the compressor.

* * * * *